Dec. 1, 1964   H. E. FORSYTHE, JR   3,159,294
SLIDING AND TILTABLE LOAD CARRYING BED FOR VEHICLES
Filed July 12, 1962   3 Sheets-Sheet 1

INVENTOR.
HENRY E. FORSYTHE
BY Raymond N. Matson
AGENT.

Dec. 1, 1964  H. E. FORSYTHE, JR  3,159,294
SLIDING AND TILTABLE LOAD CARRYING BED FOR VEHICLES
Filed July 12, 1962  3 Sheets-Sheet 2
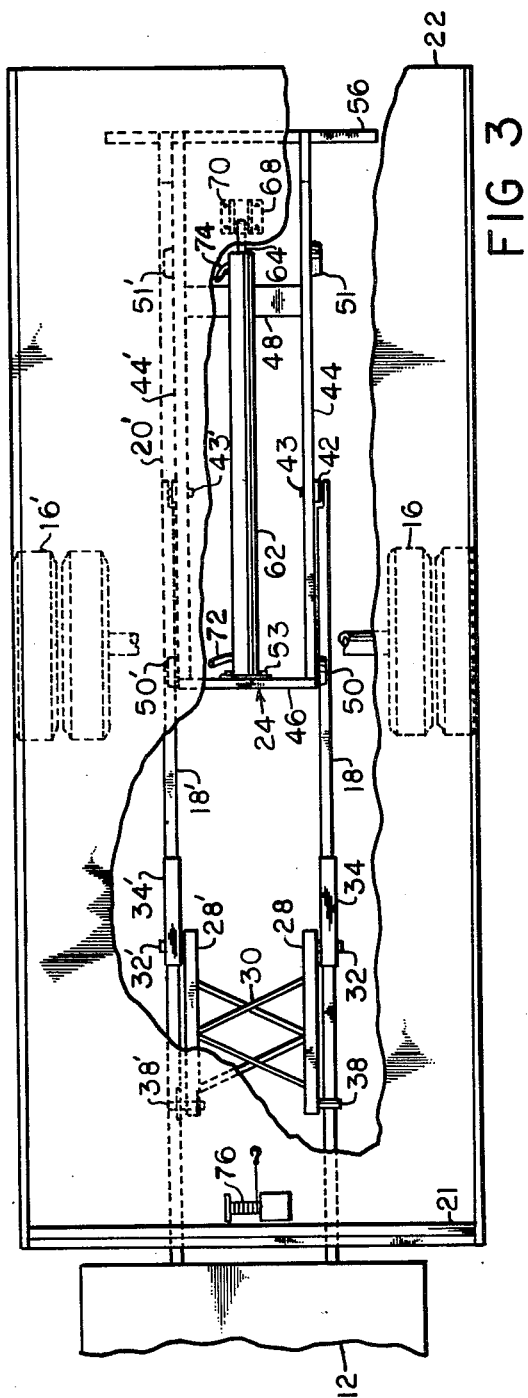
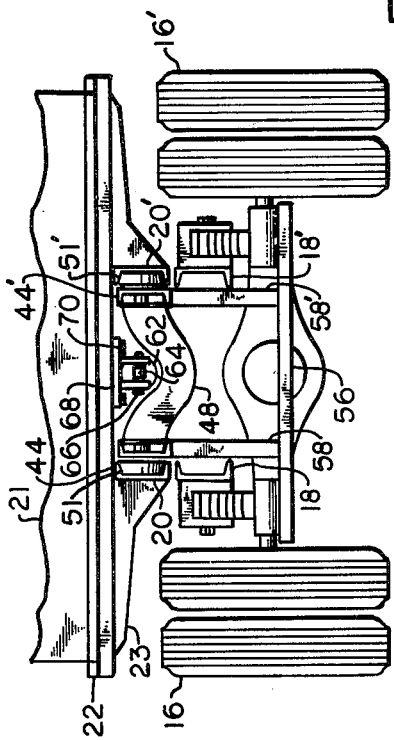
INVENTOR.
HENRY E. FORSYTHE
BY
AGENT.

United States Patent Office 3,159,294
Patented Dec. 1, 1964

3,159,294
SLIDING AND TILTABLE LOAD CARRYING
BED FOR VEHICLES
Henry E. Forsythe, Jr., Greencastle, Pa., assignor to
Greencastle Equipment Manufacturing Company
Filed July 12, 1962, Ser. No. 209,470
5 Claims. (Cl. 214—505)

This invention relates generally to vehicles having heavy load carrying bodies or beds and more particularly to such a bed for a vehicle wherein the bed is movable toward the rear and tiltable into engagement with the ground to form a ramp up which loads may be pulled or other vehicles driven.

Vehicle beds of this general type are known in the art but are usually characterized by a number of objectionable features so as to make them impractical or undesirable for the use intended. Among these are: a poor placement of the bed pivot so that the front vehicle wheels are lifted dangerously from the ground during loading; an overly long unsupported or unbraced bed span when tilted resulting in failure thereof or damage thereto; an excessive power requirement to effect rearward movement of the bed due to friction; an articulated bed-supporting frame reducing the rigid frame size and thus the load weight which may be transported; and an excessively steep angle of tilt of the bed resulting in further dangerous loading conditions and greater power requirements.

Accordingly, the main object of the present invention is to provide an improved rearwardly movable and tiltable bed for load carrying vehicles which will obviate the above and other objectionable features characterizing known structures.

An important object of the present invention is to provide an improved bed for vehicles which may be readily moved rearwardly and tilted into engagement with the ground to form a strong, rigid, braced ramp having a minimum angle of inclination for the safe handling of loads onto or from the bed.

Another important object of the present invention is to provide a load carrying vehicle bed which is movable to the rear with respect to the vehicle frame and simultaneously lifted at its front end to tilt it as it moves to form a ground engaging loading ramp.

A further important object of the present invention is to provide a vehicle having a rearward moving and tilting bed to form a loading ramp which is supported at its front end and intermediate the span rearward of the vehicle when in the tilted position.

A still further important object of the present invention is to provide an improved vehicle and moving and tilting bed combination wherein a rocking subframe is pivoted to the vehicle frame, a bed is constrainedly mounted for forward and rearward movement on the subframe, power means is mounted between the subframe and the bed to effect such movement, and a lift lever is pivotally connected to the bed and to the main frame so that rearward movement of the bed effects a lifting of the front end thereof.

Other objects and advantages of the invention will become apparent during the course of the following description.

In the drawings I have shown one embodiment of the invention. In this showing:

FIGURE 3 is a top plan view to a slightly enlarged scale of the bed in load carrying position, parts being broken away or omitted for clarity;

FIGURE 4 is a rear elevational view to a further enlarged scale of the bed in load carrying position on the vehicle;

Figure 1:
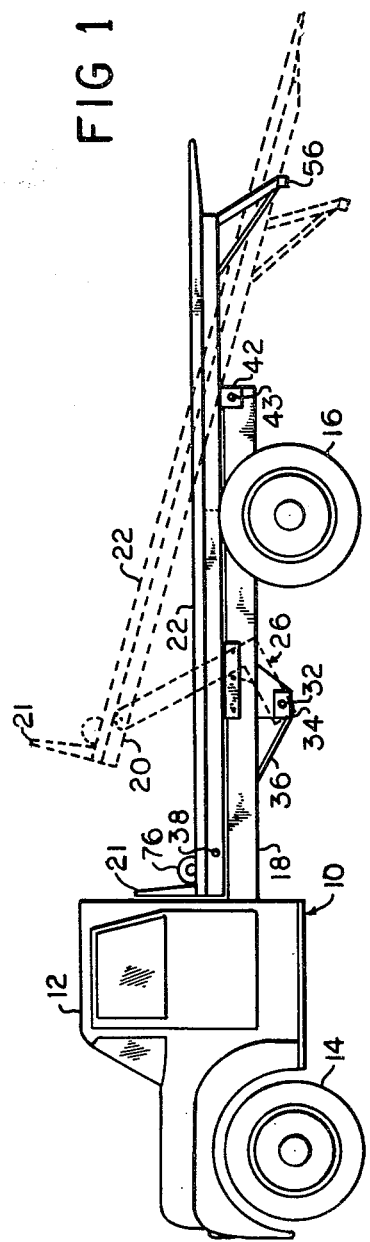
FIGURE 1 is a side elevational view of the invention in load carrying position on a vehicle, an intermediate position being indicated in dotted lines.

Referring to the drawings which illustrate one form of vehicle upon which the bed comprising the present invention may be mounted, numeral 10 designates a truck having a cab 12 enclosing the engine, controls, and associated equipment, and a set of front and dual rear wheels 14, 14' and 16, 16' respectively which support the truck main frame comprising heavy, parallel, longitudinally extending, connected channels 18, 18'. The bed, designated as 22, is provided with a head board 21 and although not disclosed, it will be understood that the bed 22 may be provided with sides, side gates, etc.

Figure 6:
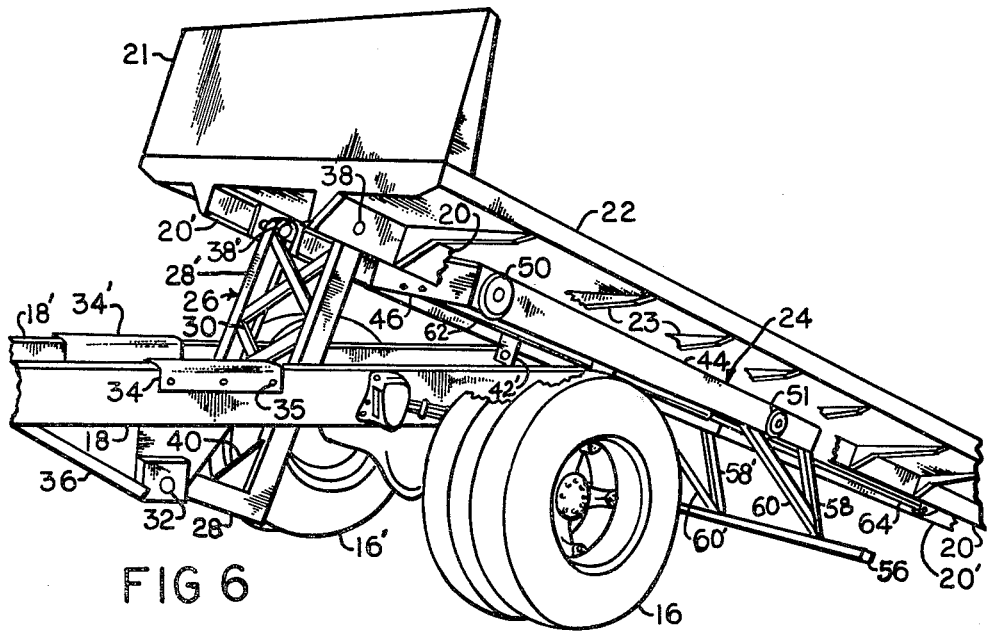
FIGURE 6 is a perspective view of the bed in ramp position and showing details of the lift lever structure.

The bed is supported by a pair of heavy, parallel, longitudinally extending, connected, channels 20, 20' and a plurality of longitudinally spaced, laterally extending reinforcing ribs 23 (FIGURES 4 and 6). The main frame, the bed, and the bed frame are preferably formed of steel although other materials such as wood may be employed for the bed and its reinforcing ribs. The bed 22 and its frame 20, 20' is supported by a rocking subframe indicated as a whole as 24 which is pivotally mounted on the main frame 18, 18'.

Figure 5:
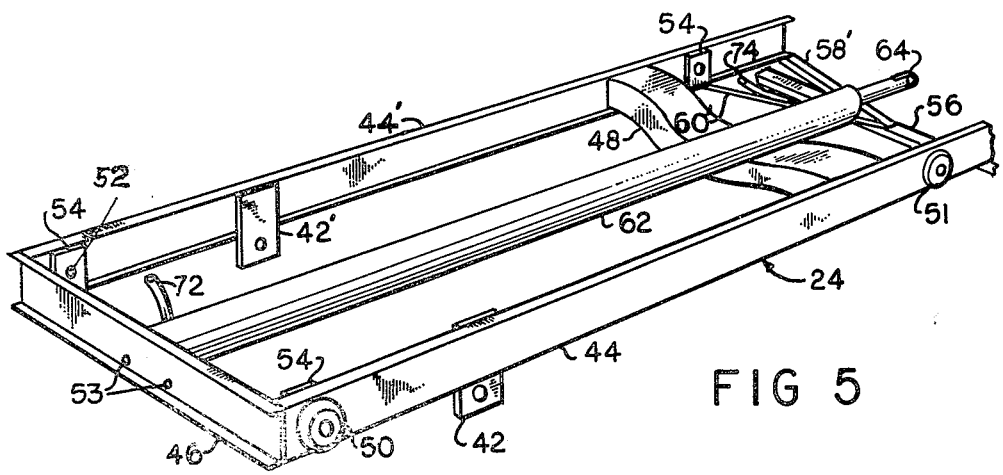
FIGURE 5 is a perspective view of the subframe upon which the bed is rollably mounted.

The rocking frame 24 (FIGURE 5) comprises a pair of spaced parallel channel beams 44, 44' connected by a front channel brace 46 and a rear curved brace 48; a pair of pivot fitting brackets 42, 42'; a transverse ground support bar 56 rigidly fixed to the beams 44, 44' by brace members 58, 58', 60, 60'; an hydraulic cylinder-piston actuator 62; and four rollers 50, 50', 51, 51' and their associated bearing support plates 54.

With the exception of the roller attaching bolts 52, and the bolts 53 attaching the hydraulic actuator 62 to the front brace 46, the members of the rocking subframe 24 are preferably welded together to form a strong, rigid and unitary structure.

Figure 2:
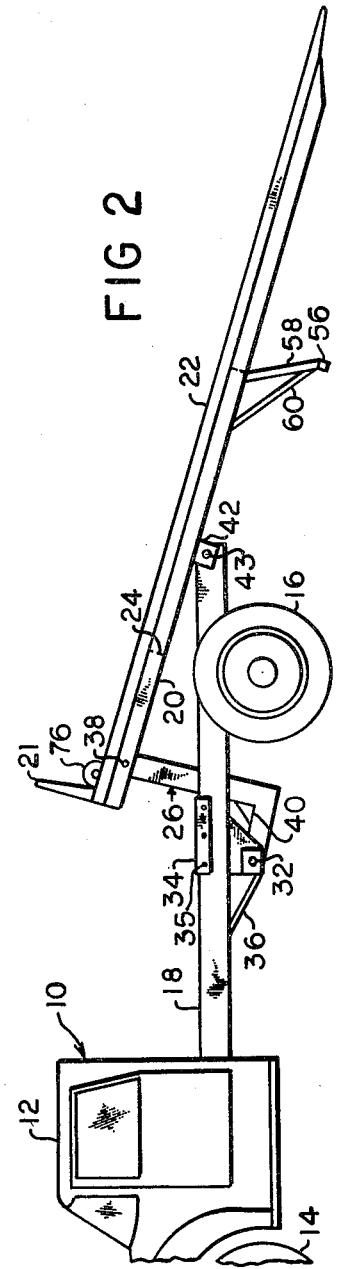
FIGURE 2 is a similar view showing the bed moved back and tilted to its position as a loading ramp.

The rocking frame 24 is pivotally connected to the rear ends of the main frame 18, 18' by pivot pins 43, 43' (FIGURES 1, 2 and 3). The supporting beams 20, 20' of the bed 22 engage and rest on the rollers 50, 51, and 50', 51', respectively and hence the bed 22 is constrained by the channel flanges (FIGURE 4) to a fore and aft relative movement with respect to the rocking frame 24 and rocks with it.

The relative fore and aft movement of the bed 22 on the rollers of the rocking frame 24 is effected by the hydraulic actuator 62 whose piston rod 64 is connected by a bolt 66 to a bracket 68 attached to the underside rear of the bed by bolts 70. Pressure fluid conduits 72 and 74 are connected to opposite ends of the hydraulic actuator 62 and, through a control valve (not shown), to a source of hydraulic pressure as is conventional for a double acting hydraulic actuator.

During rearward movement of the bed 22 on the rocking frame 24, the front end of the bed is lifted by a lever indicated as a whole as 26 (FIGURES 1, 2, and 6). This lever comprises a pair of parallel L-shaped side arms 28, 28' reinforced by triangular gussets 40, 40' respectively and rigidly connected by braces 30 as by welding.

The side arms 28, 28' are pivotally connected at one of their ends to the forward ends of the bed frame beams 20, 20' respectively as at 38, 38'. The other ends are pivotally connected as at 32, 32' to a pair of support brackets 34, 34' which are fixed to the main frame beams 18, 18' by bolts 35 and braced by members 36. To facilitate loading or unloading of the vehicle, a winch 76 is mounted on the forward end of the bed 22 and if desired, may be powered by hydraulic pressure fluid from the same source as earlier mentioned.

*Operation*

The vehicle is suitably positioned adjacent the load to be transported and hydraulic pressure fluid is admitted to the actuator 62 by the conduit 72 forcing the piston and the rod 64 rearwardly. This moves the bed 22 rearwardly on the rollers 50, 50', 51, 51' which engage the channel beams 20, 20'. As soon as the bed 22 starts to move rearwardly, the pivot points 38, 38' move upwardly and rearwardly through an arc defined by the lifting lever 26 pivoting at points 32, 32' as its center. As the bed moves rearwardly and is being lifted at its front end by the lever 26, it is tilted or rocked substantially as a unit with the rocking frame 24 about the pivot points, 43, 43'.

When the bed 22 has been moved by the hydraulic actuator 62 from the solid line position of FIGURE 1, through the dotted line position and to the position of FIGURE 2, the rear end of the bed 22 and the ground support bar 56 simultaneously engage the ground. The movement of the actuator is stopped and the vehicle bed 22 is in the loading or unloading ramp position. A vehicle may now be driven onto or from the bed 22 or a disabled vehicle or other load may be moved up or down the ramp by means of the winch 76.

After the load has been placed on or removed from the ramp, hydraulic pressure fluid is admitted to the opposite end of the actuator 62 by the conduit 74 to retract the piston rod 64 and move the vehicle bed 22 forwardly on the rollers, and it rocks with the rocking frame 24 as the front end of the bed swings forwardly and downwardly as it is lowered by the lifting lever 26 into its normal, level, at rest, transport position.

It will now be apparent that the unique construction of the invention provides a safe loading position of the bed by a ramp angle which is substantially lower than conventionally provided and thus facilitates the loading of heavy vehicles and other loads without requiring additional manpower, or the use of cranes or other expensive and unwieldy equipment.

It will also be apparent that the provision of the ground engaging support bar 56 intermediate the rear wheels and the rear end of the bed 22 eliminates any long unsupported bed span and affords the necessary support to safely allow the loading of very heavy loads without damaging the bed or causing the front wheels of the vehicle to be lifted off the ground. Moreover, it will be noted that the span of the bed forward of the pivots 43 receives support from the lifting lever 26 whenever the bed is in any but a level position on the main frame 18, 18'.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:

1. A tiltable movable load carrying device for vehicles having a wheel supported frame comprising, in combination, a subframe pivotally mounted on the rear of the vehicle frame, a load carrying bed slidably mounted on said subframe for forward and rearward movement with respect thereto, a lever pivotally connecting said bed and the vehicle frame to lift and support the front of said bed and tilt it and said subframe when not in its forwardmost position with respect to said subframe, and power means supported by said subframe and connected with said bed to move it with respect to said subframe and effect the lifting and supporting of the front of said bed by said lever and tilt the rear end of said bed toward the ground to form a loading ramp.

2. In a vehicle having a frame and supporting wheels, a subframe including rollers pivotally mounted on the rear end of the frame, a load carrying bed mounted on said rollers for relative forward and rearward sliding movement with respect to said subframe, a lever pivoted to the front of said bed and to the vehicle frame to lift and tilt said bed and support the front end thereof during rearward movement of said bed on said rollers, and power means supported by said subframe and connected with said bed to move it with respect to said subframe and effect the lifting and supporting of the front of said bed by said lever and tilt the rear end of said bed toward the ground to form a loading ramp.

3. In a tilting and sliding bed truck having a frame and supporting wheels, the combination of a rockable subframe pivoted to the rear end of the frame, rollers mounted on said subframe, a load carrying bed connected to said subframe for relative forward and rearward movement on said rollers, a lever pivoted to the forward end of said bed and to the vehicle frame and operative to lift and support said forward end and tilt said bed and subframe upon rearward movement of said bed on said rollers to effect engagement of the rear end of said bed with the ground, and power means supported by said subframe and connected with said bed to move it with respect to said subframe to pivotally operate said lever.

4. In a tilting bed truck having front and rear wheels and a main frame, the combination of a rockable subframe pivoted at substantially its fore and aft midpoint at the aft end of said main frame, rollers mounted on said subframe, a tilting load carrying bed engaging and supported by said rollers for forward and rearward movement thereon, a lift lever pivoted at one end on said bed near the forward end thereof and at the opposite end on said main frame and operable upon rearward movement of said bed to lift the front end thereof, and power means supported by said subframe and connected with said bed to move it with respect to said subframe on said rollers and lift the front end of said bed and tilt the rear end thereof into ground engagement to form a loading ramp.

5. The combination recited in claim 4, and a ground engaging brace fixed to the rear of said subframe, said brace engaging the ground when said bed is in the tilted and extreme aft ground engaging position to prevent the front wheels of the truck from lifting from the ground when the bed is being loaded.

References Cited by the Examiner

UNITED STATES PATENTS

| | | | |
|---|---|---|---|
| 1,883,472 | 10/32 | Barrett | 298—12 |
| 2,621,814 | 12/52 | Lisota | 214—505 |
| 2,812,088 | 11/57 | Cadillac et al. | 214—84 |
| 2,977,011 | 3/61 | Okerlund | 214—505 |
| 3,043,458 | 7/62 | Klosek et al. | 214—505 |

HUGO O. SCHULZ, *Primary Examiner.*

GERALD M. FORLENZA, *Examiner.*